United States Patent [19]
Chaney et al.

[11] Patent Number: 5,673,378
[45] Date of Patent: Sep. 30, 1997

[54] COLOR CODING METHOD FOR EXPANDING PALETTE BY INCLUDING COLORS DERIVED BY AVERAGING NUMERIC CODES OF ACTUAL PALETTE COLORS

[75] Inventors: John William Chaney, Indianapolis; Billy Wesley Beyers, Jr., Greenfiled; Kevin Elliott Bridgewater, Indianapolis; James Edwin Hailey, Indianapolis; Juri Tults, Indianapolis; Harold Blatter, Indianapolis, all of Ind.

[73] Assignee: Thomson Consumer Electronics, Inc., Indianapolis, Ind.

[21] Appl. No.: 561,207

[22] Filed: Nov. 20, 1995

Related U.S. Application Data

[63] Continuation of Ser. No. 961,189, Oct. 14, 1992, abandoned.

[30] Foreign Application Priority Data

Oct. 30, 1991 [GB] United Kingdom .................... 9123067

[51] Int. Cl.⁶ .................................................. G06T 11/40
[52] U.S. Cl. .......................................................... 395/131
[58] Field of Search .................. 395/131; 345/150–153, 345/138; 358/539, 525

[56] References Cited

U.S. PATENT DOCUMENTS

| | | | |
|---|---|---|---|
| 4,035,837 | 7/1977 | Starch et al. | 358/539 |
| 4,682,215 | 7/1987 | Adachi | 358/539 |
| 4,704,605 | 11/1987 | Edelson | 345/136 |
| 4,786,975 | 11/1988 | Postl | 358/539 |
| 4,825,390 | 4/1989 | Van Aken et al. | 395/131 X |
| 4,947,158 | 8/1990 | Kanno | 345/138 |
| 5,065,144 | 11/1991 | Edelson et al. | 345/153 X |
| 5,138,699 | 8/1992 | Minor et al. | 395/131 |
| 5,140,315 | 8/1992 | Edelson et al. | 345/136 |
| 5,196,834 | 3/1993 | Edelson et al. | 345/186 |
| 5,220,418 | 6/1993 | Komine et al. | 358/524 |
| 5,298,915 | 3/1994 | Bassetti, jr. | 345/149 |
| 5,321,797 | 6/1994 | Morton | 395/131 |
| 5,327,509 | 7/1994 | Rich | 395/131 X |
| 5,402,513 | 3/1995 | Schafer | 382/298 |
| 5,442,379 | 8/1995 | Bruce et al. | 345/199 |
| 5,479,272 | 12/1995 | Saito | 358/518 |

FOREIGN PATENT DOCUMENTS

| | | |
|---|---|---|
| 0 186 828 | 7/1986 | European Pat. Off. ......... G09G 1/16 |
| 2059729 | 4/1981 | United Kingdom . |
| 2100099 | 12/1982 | United Kingdom . |
| 2178277 | 2/1987 | United Kingdom . |
| WO86/05911 | 10/1986 | WIPO . |

OTHER PUBLICATIONS

Lip Schutz, Schaum's Outline of Finite Mathematics, 1966, p. 161–162.

*Primary Examiner*—Anton W. Fetting
*Attorney, Agent, or Firm*—Joseph S. Tripoli; Peter M. Emanuel; Robert D. Shedd

[57] ABSTRACT

A color interpolation circuit allows information uniquely identifying one of six colors to be stored by using only two binary bits of memory storage, and allows information uniquely identifying one of 120 colors to be stored by using only four binary bits of memory storage. This is accomplished by storing only the foreground, edge, and background colors (i.e., herein referred to as "independent" colors), and an "interpolate operator" code, and by providing circuitry to properly interpret and process the interpolate operator code to generate "intermediate colors". This permits a 33% reduction of memory size and reduces the "fetch speed" requirements of associated on-screen display (OSD) scan converter circuitry.

7 Claims, 6 Drawing Sheets

COLOR CODING METHOD FOR EXPANDING PALETTE BY INCLUDING COLORS DERIVED BY AVERAGING NUMERIC CODES OF ACTUAL PALETTE COLORS

This is a continuation of application Ser. No. 07/961,189, filed Oct. 14, 1992, now abandoned.

FIELD OF THE INVENTION

The subject application generally concerns the field of on-screen display circuitry for television receivers.

BACKGROUND OF THE INVENTION

It is known that the generation of alphanumeric characters for display on a television receiver having smooth color transitions is desirable. The appearance of smooth color transitions is generally achieved through the use of intermediate colors. This is explained as follows. A digitally-generated display of a character is, of course, not actually continuous, but rather is "painted" in discrete "pixels" (i.e., picture elements). Assume a display having a horizontal resolution of 640 pixels per line, and a vertical resolution of 400 lines. If, on such a display, a diagonal black line is shown on a red background, then the diagonal line will appear jagged along its edges. If a third color, for example, very dark red, is used in a few places along the edges of the diagonal black line, then the jagged appearance of the line will be considerably reduced. That is, the eye integrates the color change from black through dark red to red, and the line appears to be smooth.

A text character that is edged or drop-shadowed has three distinct colors, a first color for the foreground, a second color for the edge, and a third color for the background. In order to generate characters having a smooth appearance at a resolution of 640 by 400 pixels (or a somewhat smoother appearance at a lesser resolution), 3 additional colors are needed. These additional colors are 1) an average color between the foreground color and the edge color, 2) an average color between the edge color and the background color, and 3) an average color between the foreground color and the background color. Thus, a total of 6 colors is required (i.e., three independent and three intermediate colors)..

Heretofore, in order to define and store in binary form which one of six possible colors is to be assigned to a pixel, required three binary bits. A 640 by 400 pixel resolution display would then require 3×640×400=768,000 binary bits of memory space to store the color data if each bit is to be uniquely controllable. In view of memory costs and power dissipation considerations such a large array is prohibitive in a television receiver.

SUMMARY OF THE INVENTION

It is herein recognized that information uniquely identifying one of six colors can be stored by using only two binary bits of memory storage, and information uniquely identifying one of 120 colors can be stored by using only four binary bits of memory storage. This is accomplished by storing only the foreground, edge, and background colors (i.e., herein referred to as "independent" colors), and an "interpolate operator" code, and by providing circuitry to properly interpret and process the interpolate operator code to generate "intermediate colors". This permits a 33% reduction of memory size and reduces the "fetch speed" requirements of associated on-screen display (OSD) scan converter circuitry.

DETAILED DESCRIPTION OF THE EMBODIMENT

Figure 1:
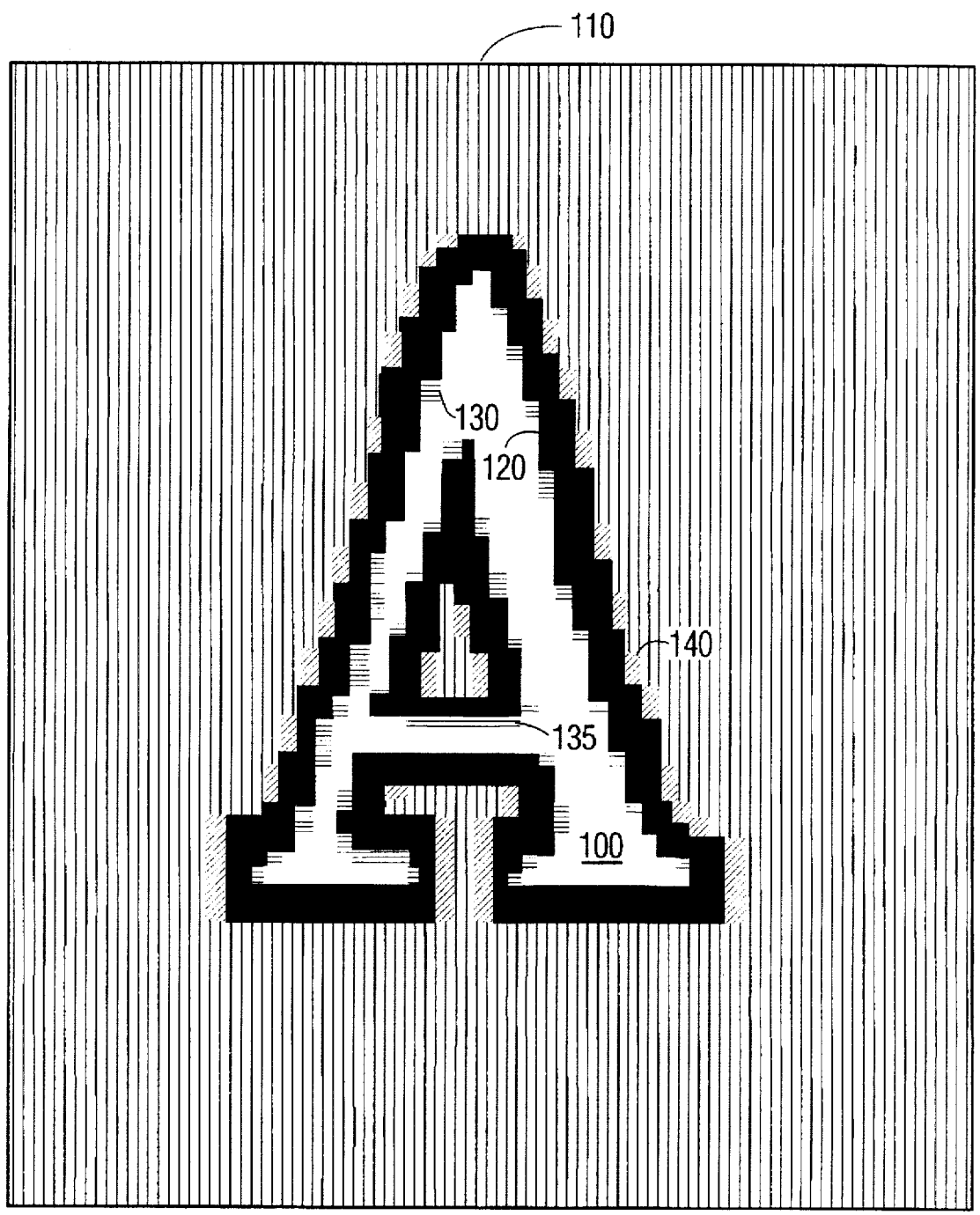
FIG. 1 is a representation of a text character showing areas containing intermediate colors.

Referring to FIG. 1, the text character "A" is illustrated substantially as it would appear in pixel format for display on a television screen. The character comprises a foreground color 100 (white), a red background color, 110 (indicated by the vertically-striped area), an edge color 120 (black), a plurality of gray areas 130 (indicated by the horizontally-striped areas), and a plurality of dark red areas 140 (indicated by the diagonally-striped areas). As noted above, the white foreground, black edge, and red background are the independent colors of the character image. The gray areas are intermediate color areas added to smooth the transitions between black and white areas. Clearly, gray is the average of black and white. The dark red areas are intermediate color areas added to smooth the transitions between black and red areas. Dark red being the average of black and red. As stated above, the addition of intermediate colors to smooth the appearance of text characters is well known in the art.

The subject invention describes a color interpolation system. Before describing its circuitry in detail, an explanation of the interpolate feature may be in order. The color interpolation feature facilitates the display of smoothly-edged text and extends the number of simultaneously displayable colors. Even in a high resolution mode of operation (i.e., 640 pixel per line, rather than 320 pixels per line), smooth diagonal color transitions can only be generated by using intermediate colors. This use of intermediate colors was noted above with respect to FIG. 1. The interpolation feature provides for the generation of the intermediate color between two palette colors. In high resolution mode, the OSD can generate, and uniquely define, three independent colors and three intermediate colors with only 2 bits per pixel. In lower resolution mode, the OSD can generate, and uniquely define, fifteen independent colors and 105 intermediate colors with only 4 bits per pixel. In general, the number of intermediate colors is equal to the total number of combinations of subsets of the independent colors taken two at a time. That is, the number of intermediate colors is equal to $2^N - 1 C_2$ (where N is the number of binary bits expressing independent color locations in the palette, and the combinations C are formed by taking the independent colors two at a time). For example, if the number of palette colors is 16, then N equals 4, and the number of intermediate colors is equal to $_{15}C_2$, or 105 (i.e., 15!/(13!×2!))

Traditionally, color mapped systems using 2 bits per pixel, define a particular one of four colors as one of 0 through 3 for each pixel. In contrast, apparatus according to the subject invention defines bit patterns 1 through 3 as specific independent colors, and reserves the code "0" as a special operator known as the interpolate operator. This system operates as follows. In the incoming bit stream, a pixel sequence 111 means to paint 3 pixels in a row with the color stored in palette location 1. The sequence 102 means to paint 3 pixels in a row, the first with the color stored in palette location 1, the second with the average of the colors stored in palette locations 1 and 2, and the third with the color stored in palette location 2.

Figure 4:
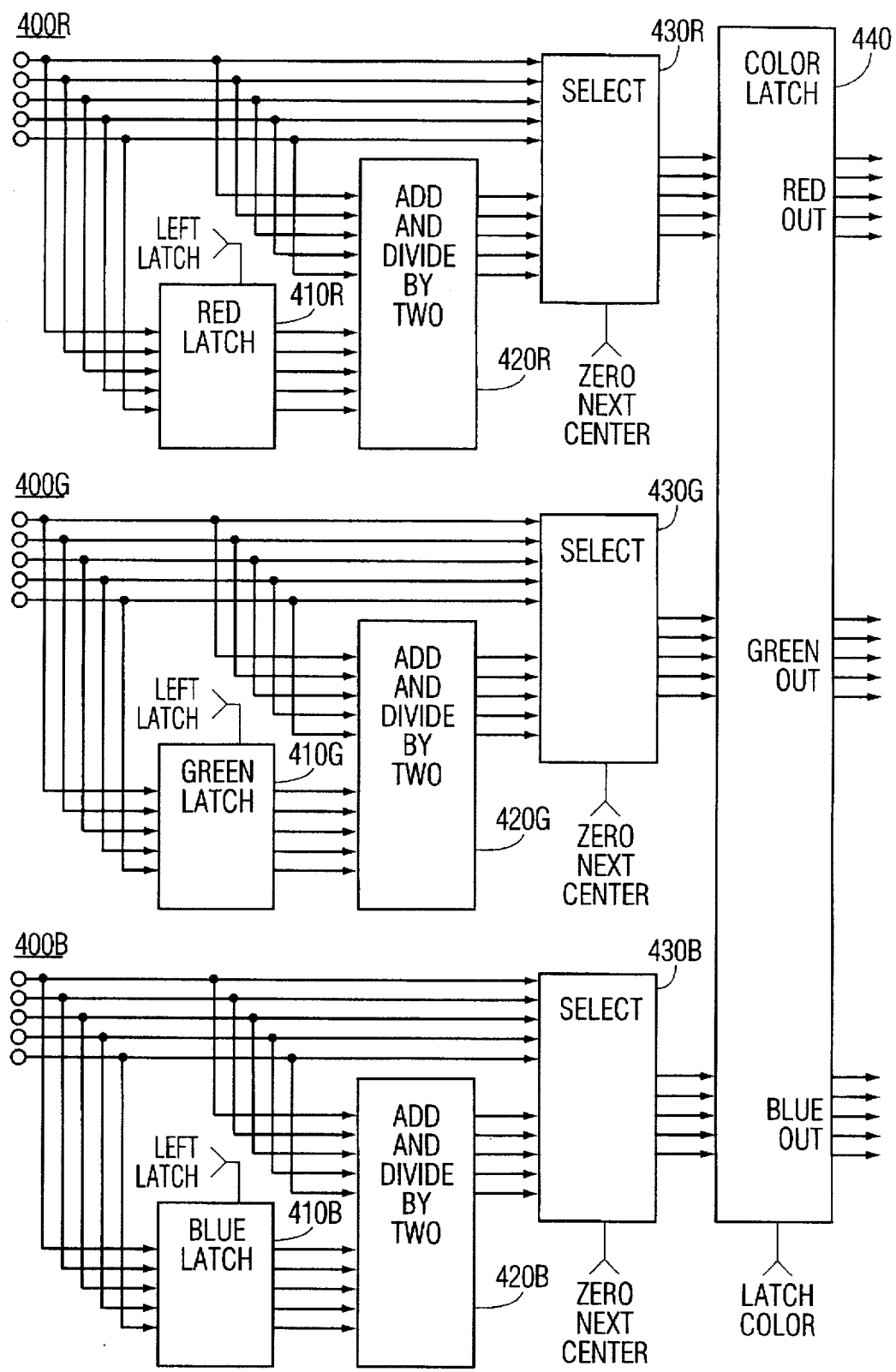
FIGS. 4, 5, and 6, are simplified block diagrams of portions of the integrated circuit of FIG. 3.

The average of the colors stored in palette locations 1 and 2 is obtained by averaging the RGB color components separately. If color 1 is (r1, g1, b1) and color 2 is (r2, g2, b2), then the interpolated color is: ((r1+r2)/2, (g1+g2)/2, (b1+b2)/2). The circuitry to perform the color component averaging is shown in FIG. 4, and will be described in detail below.

Figure 6:
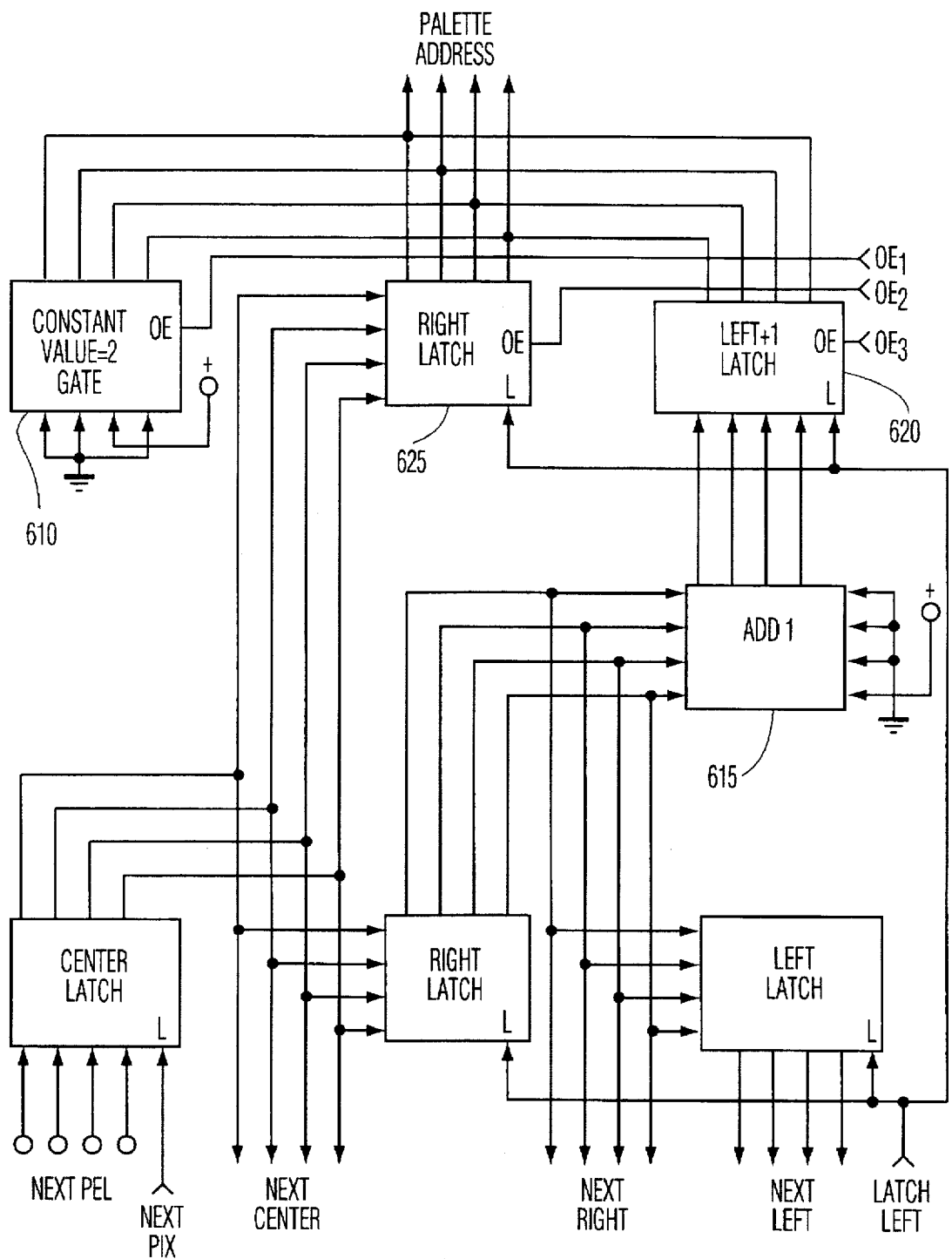

It is also useful to define the sequences 101, 202, and 303. Pixel sequence 101 causes the first pixel to be painted in color 1, the second pixel is painted with the average of color 1 and color 2, and the third pixel is painted with color 1. An example of a use for this feature appears in FIG. 1 wherein a shading bar 135 is drawn between two areas of white (rather than on a transition from white to black). Pixel sequence 202 causes the first pixel to be painted in color 2, the second pixel to be painted with the average of colors 2 and 3, and the third pixel to be painted with color 2. Pixel sequence 303 causes the first pixel to be painted with color 3, the second to be painted with the average of color 2 and color 3, and the third to be painted with color 3. The circuitry to accomplish the definition of special sequences 101, 202, and 303 is shown in FIG. 6, and will be described in detail below.

Figure 2:
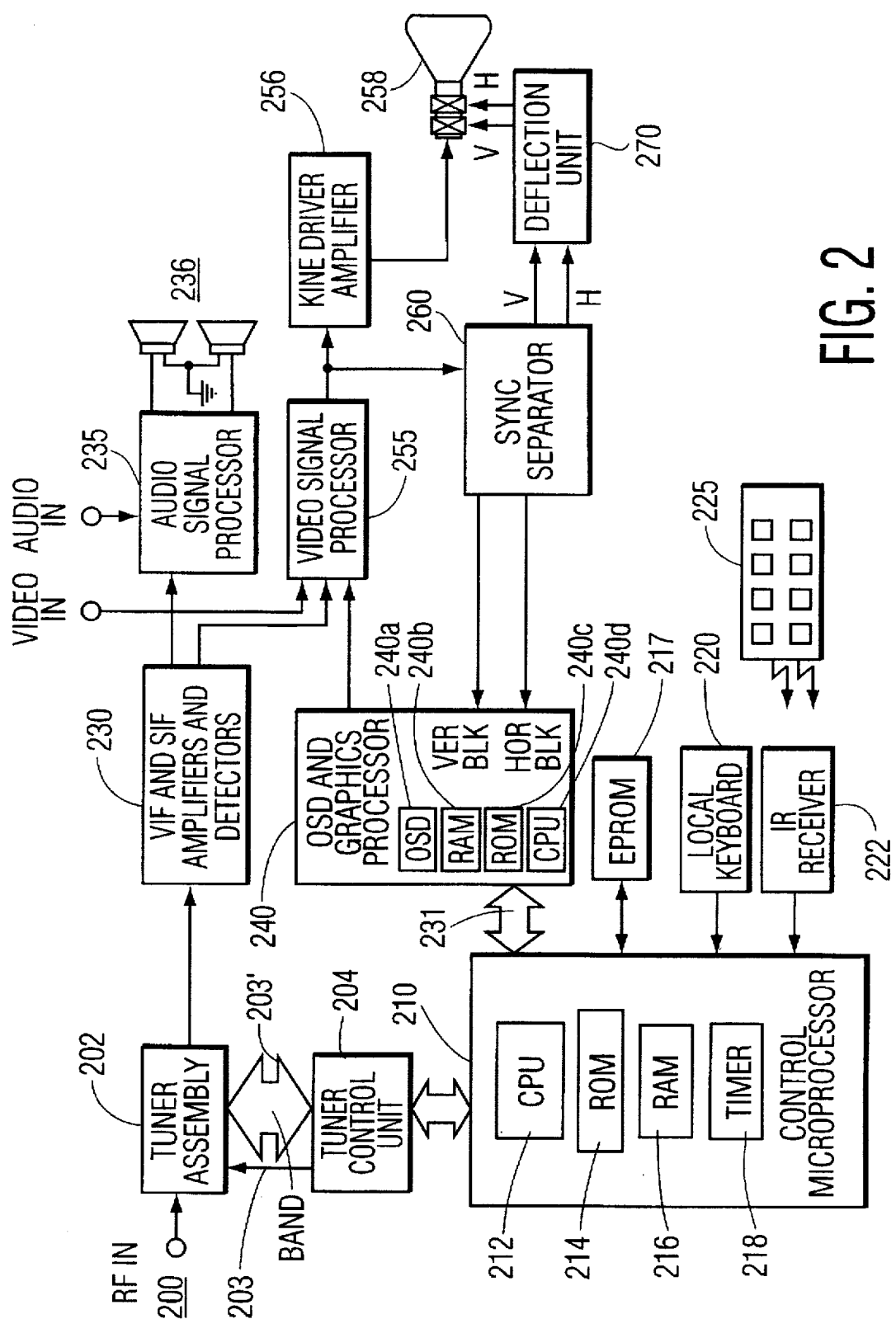
FIG. 2 is a simplified block diagram of a television receiver incorporating the subject invention.

A television receiver incorporating the subject invention is shown in FIG. 2. Referring to FIG. 2, a television receiver includes an RF input terminal 200 which receives radio frequency (RF) signals and applies them to a tuner assembly 202. Tuner assembly 202 selects and amplifies a particular RF signal under control of a tuner controller 104 which provides a tuning voltage via a wire 203, and bandswitching signals via signal lines represented by the broad double-ended arrow 203', to tuner assembly 202.

Tuner assembly 202 converts the received RF signal to an intermediate frequency (IF) signal and provides an IF output signal to video (VIF) and sound (SIF) amplifier and detector unit 230. VIF/SIF amplifier and detector unit 230 amplifies the IF signal applied to its input terminal and detects the video and audio information contained therein. The detected video information is applied as one input of a video processor unit 255. The other input of video processor unit 255 is connected to an on-screen display and graphics processor circuit 240. The detected audio signal is applied to an audio processor 235 for processing and amplification before being applied to a speaker assembly 236.

Tuner controller 204 generates the tuning voltage and bandswitching signals in response to control signals applied from a system control microcomputer (μC)210. The terms "microcomputer", controller, and "microprocessor", as used herein, are equivalent. It is also recognized that the control function of microcomputer 210 may be performed by an integrated circuit especially manufactured for that specific purpose (i.e., a "custom chip"), and the term "controller", as used herein, is also intended to include such a device. Microcomputer 210 receives user-initiated commands from an infrared (IR) receiver 222 and from a "local" keyboard 220 mounted on the television receiver itself. IR receiver 222 receives IR transmissions from remote control transmitter 225. Microcomputer 210 includes a central processing unit (CPU) 212, a program memory (ROM) 214, and stores channel-related data in a random-access memory (RAM) 216 RAM 216 may be either internal to, or external to, microprocessor 210, and may be of either the volatile or non-volatile type. The term "RAM" is also intended to include electrically-erasable programmable read only memory (EEPROM) 217. One skilled in the art will recognize that if volatile memory is utilized, that it may be desirable to use a suitable form of standby power to preserve its contents when the receiver is turned off.

Microcomputer 210 also includes a timer 218 the operation of which will be described below. Microcomputer (or controller) 210 generates a control signal for causing tuner control unit 204 to control tuner 202 to select a particular RF signal, in response to user-entered control signals from local keyboard 220 and from infrared (IR) receiver 222.

Tuner 202 produces a signal at an intermediate frequency (IF) and applies it to a processing unit 230 comprising a video IF (VIF) amplifying stage, an AFT circuit, a video detector, and a sound IF (SIF) amplifying stage. Processing unit 230 produces a first baseband composite video signal (TV), and a sound carrier signal. The sound carrier signal is applied to an audio signal processor unit 235 which includes an audio detector and may include a stereo decoder. Audio signal processor unit 235 produces a first baseband audio signal and applies it to a speaker unit 236. Second baseband composite video signals and second baseband audio signals may be applied to VIDEO IN and AUDIO IN terminals from an external source.

The first and second baseband video signals (TV) are coupled to a video processor unit 255 (having a selection circuit not shown). Under control of controller 210, an on-screen display processor 240 generates character signals and graphics signals, and applies them to a second input of video signal processor 255, for inclusion in the processed video signal. Electrically-erasable programmable read only memory (EEPROM) 217 is coupled to controller 210, and serves as a non-volatile storage element for storing auto-programming channel data, and user-entered channel data.

The processed video signal at the output of video signal processor unit 255, is applied to a Kine Driver Amplifier 256 for amplification and then applied to the guns of a color picture tube assembly 258 for display. The processed video signal at the output of video signal processor unit 255, is also applied to a Sync Separator unit 260 for separation of horizontal and vertical drive signals which are in turn applied to a deflection unit 270. The output signals from deflection unit 270 are applied to deflection coils of picture tube assembly 258 for controlling the deflection of its electron beam. The television receiver described thus far with the exception of OSD and GRAPH/CS PROCESSOR 240 is known, for example, from the RCA CTC-140 color television manufactured by Thomson Consumer Electronics, Inc., Indianapolis, Ind.

OSD and GRAPH/CS PROCESSOR 240 includes an on screen display (OSD) unit 240a, a RAM 240b, a ROM 240c, and a CPU 240d. A portion of OSD and GRAPH/CS PROCESSOR 240 is shown in greater detail in block diagram form in FIG. 3. A crystal-controlled oscillator 300 supplies 28 MHz clock signals to SYNC LOCK AND CLOCK GENERATION circuit 310. SYNC LOCK AND CLOCK GENERATION circuit 310 receives vertical blanking (VER BLK) and horizontal blanking (HOR BLK) signals from SYNC SEPARATOR circuit 260 of FIG. 2, and provides timing signals to a HORIZONTAL POSITION unit 315, a VERTICAL POSITION unit 320, a SYSTEM TIMING unit 345, a COLOR ROTATE & MODE SELECTION unit 325, a RASTER MAP unit 330, a CHARACTER MAP unit 335, and a FIELD PARAMETER unit 340.

HORIZONTAL POSITION unit 315 generates timing signals for left and right margins, and for start of character timing. VERTICAL POSITION unit 320 generates timing signals for top and bottom margins and start of display page timing. SYSTEM TIMING unit 345 receives HCLK signals from HORIZONTAL POSITION unit 315, VCLK signals from VERTICAL POSITION unit 320, and provides row, line, column and other timing for the on screen display (OSD). COLOR ROTATE & MODE SELECTION unit 325 uses video information from a VIDEO BUFFER UNIT 375 to generate pixel (picture element) information for several different modes of operation, such as, graphics mode, teletext mode, text mode, and 320/640 pixel scan modes. RASTER MAP unit 330 generates the raster map address for the current cell to be displayed. CHARACTER MAP unit 335 generates character addresses using current cell and line information. FIELD PARAMETER unit 340 generates RAM (random access memory) addresses for field parameters.

RASTER MAP unit 330, CHARACTER MAP unit 335, and FIELD PARAMETER unit 340, provides signals to an ADDRESS MULTIPLEXER unit 380 which selects which address will be placed on the memory address bus. Communication of data between the above-named units and external circuitry is conveyed via a data bus, known in the art as an IMbus. IMbus 371 conveys data to external circuitry via an IMbus INTERFACE unit 370. A MICRO-COMPUTER LOGIC unit 385 serves as a memory manager and enables the system to address more than 64K bytes of RAM.

A COLOR MULTIPLEXER & MARGIN CONTROL unit 350 receives LEFT MARGIN (LM), RIGHT MARGIN (RM), and START CHARACTER (SC) signals from HORIZONTAL POSITION unit 315, receives ROW SPACING (RS), TOP MARGIN (TM), BOTTOM MARGIN (BM), START PAGE (SP), VERTICAL SCROLL (VS), and MARGIN COLOR (MC), signals from VERTICAL POSITION unit 320, and receives a CHARACTER COLOR signal from COLOR ROTATE & MODE SELECTION unit 325. COLOR MULTIPLEXER & MARGIN CONTROL unit 350 ensures that pixel information is output so that it is displayed within the area bounded by the margins. A four bit palette address signal (PIXEL COLOR (PC)) is provided to COLOR PALLETTE unit 355. COLOR PALLETTE unit 355 is a 16 color memory, containing 16 registers, each of which holds a 16 bit word defining a particular color (i.e., 5 bits of red information, 5 bits of green information, 5 bits of blue information, and 1 bit for OSD/VIDEO transparency information). The particular 16-bit word addressed by the PIXEL COLOR signal is applied to an INTERPOLATE unit 360, which will be described in detail below. A sixteen bit color signal is output from INTERPOLATE unit 360 and applied to a digital to analog converter (D/A) unit 365 which converts the digital data to an analog form for ultimate display on picture tube 258.

Figure 3:
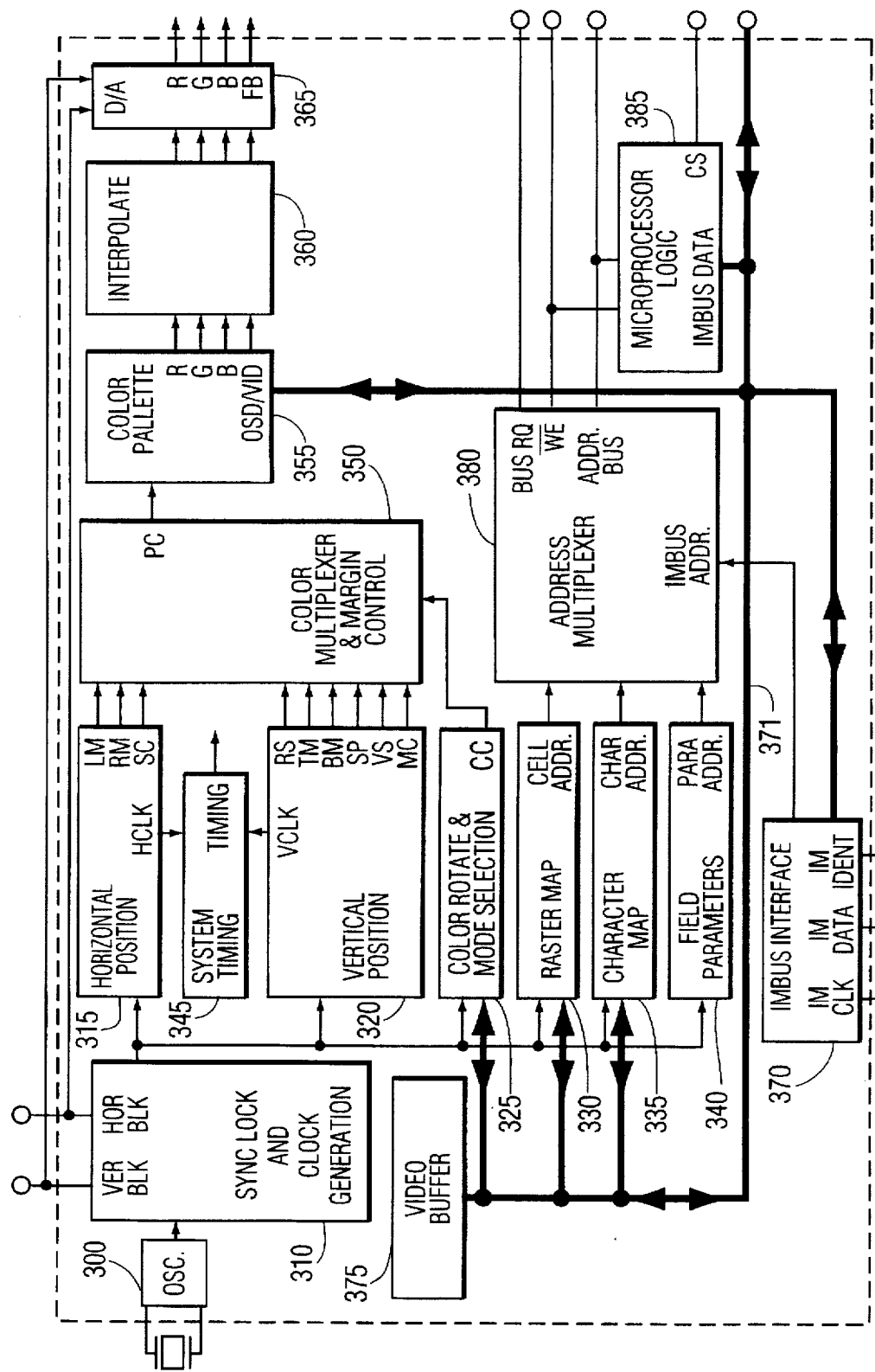
FIG. 3 is a simplified block diagram of an integrated circuit suitable for implementing the subject invention.
Figure 5:
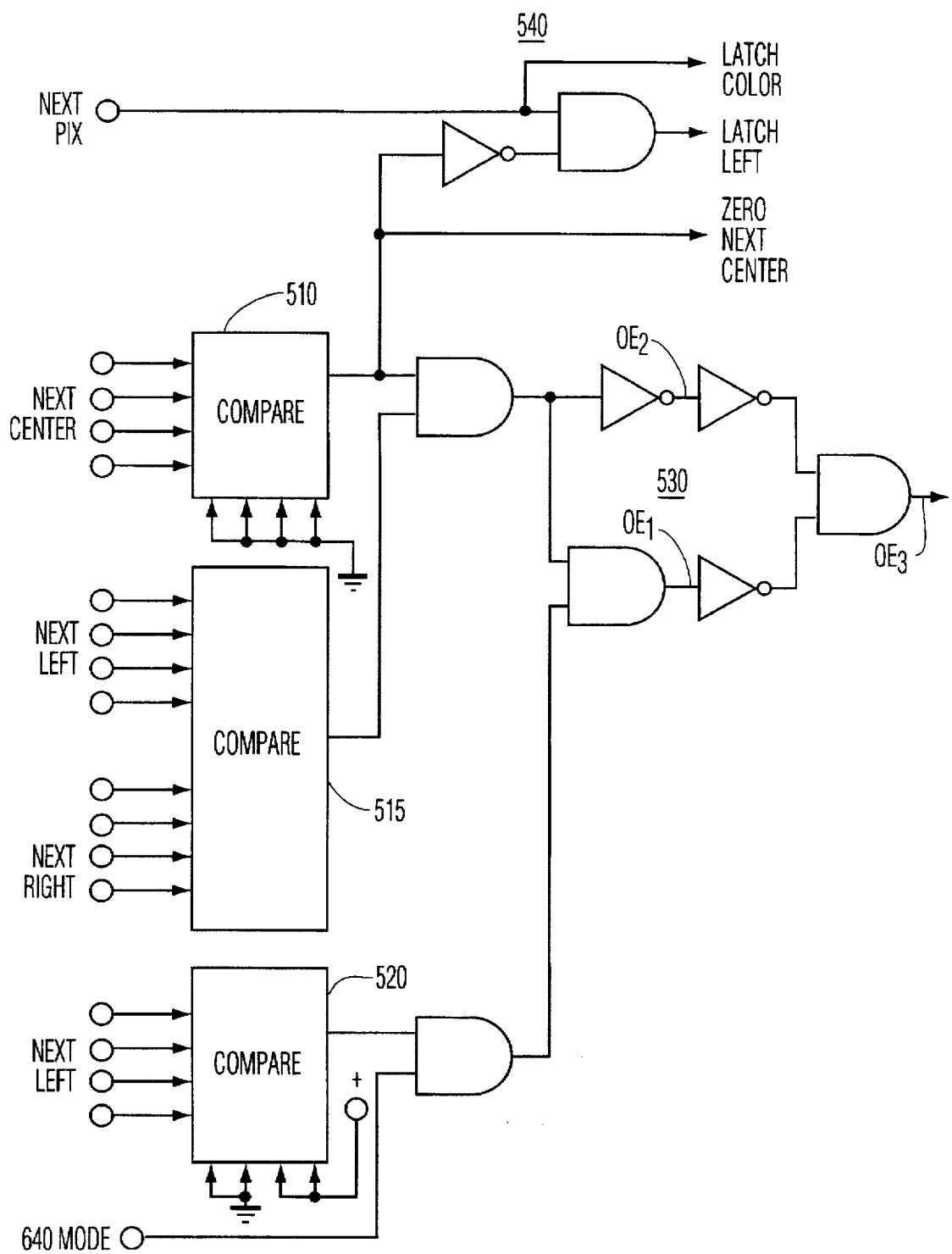

FIGS. 4, 5, and 6, show, in simplified form, the relevant circuitry contained in INTERPOLATE unit 360 of FIG. 3. It should be noted at this point that consecutive interpolated colors may also be displayed. That is, x00y means to paint the first pixel with the color contained in palette location "x", the second and third with the average of colors x and y, and the fourth with color "y". In general, x0...0y, (where 0...0 means n zeros) means that pixel 1 is painted with color x, pixel n+2 is color y, and pixels 2 through n+1 are painted with the average of colors x and y. In order to simplify machine readability of these codes, the operator chains are written in "Polish notation" instead of "in-fix notation". Thus, the pixel sequence x0y is actually written as xy0; x00y is written as xy00; and x000y is written as xy000.

In this way, the machine immediately gets the averaging colors and needs only to look one pixel ahead. In displaying text, color 1 is the background, color 2 is the edge or drop shadow, and color 3 is the foreground.

The averaging circuitry is shown in FIG. 4. Three identical parallel paths are shown, one for each color component. For brevity, only the red color component path will be described. LATCH LEFT is a signal generated by circuitry generally designated 540 of FIG. 5 upon the detection of the interpolate operator "0". the LATCH LEFT signal causes a color intensity value present on bus 400R to be latched into red latch 410R. The next color intensity value present on bus 400R will be added to the value latched into red latch 410 R and a binary division performed on the sum (i.e., shift fight one place), by ADD AND DIVIDE BY TWO unit 420R. The average of the two intensities of the same color component is presented to a SELECT (i.e., multiplexer) unit 430R. A selection signal ZERO NEXT CENTER selects the average value for the output value for color latch 440 when the center pixel is defined by an interpolate operator "0".

Turning to FIG. 5, a comparator 510 detects the interpolate operator "0"; a comparator 515 detects the 101, 202, and 303 sequences; and a comparator 520 detects the 303 sequence by comparing against a constant, hard-wired binary number three. Logic generally designated 530, produces output enable signals OE1, OE2, and OE3 which are applied to the circuitry of FIG. 6.

As noted above, FIG. 6 addresses the problem of defining the particular conditions 101, 202, and 303. Output enable signal OE1 is only true for the condition 303, and forces the application of a constant value 2 to the palette address via a transmission gate. In this way, the second pixel of the 303 triplet will be painted with the average of colors 2 and 3. Output enable signal OE2 is true except for the conditions where both the center pixel is "0" and where the left and fight pixels are of equal color such as 101 and 202. In that case, we want the center pixel to be the average of the left pixel and the left pixel plus one ( i.e., the average of 1 and 2 for the case of 101, and the average of 2 and 3 for the case of 202). This is accomplished by an adder 615, and a latch 620 gated by output enable signal OE3. All other cases are handled by a latch 625 which is gated on by output enable signal OE2.

The terms "television" and "television receiver" as used herein are intended to include television receivers having a display device (commonly called television sets), video monitors, and camcorders, and television receivers without a display device such as VCRs (videocassette recorders).

What is claimed is:

1. Apparatus for generating graphics, comprising:

memory means for storing graphics data;

control means for receiving graphics data comprising a plurality of digital words, each of said digital words comprising N binary bits relating to a color for a respective pixel;

said control means reading a portion of said graphics data representative of color information for at least three pixels from said memory means; and determining therefrom respective first and second independent colors for a pair of said pixels and one of a plurality of predetermined dependent colors for each pixel associated with a predetermined interpolation operator code, said independent color being one of $2^N-1$ independent colors;

said control means being responsive to said portion of said graphics data for determining if said first and second independent colors associated with said pair of pixels represent an identical independent color, and if said graphics data associated with a third pixel is an operator code, and in response to said determination, producing a particular dependent color for each case when said first and second independent colors of said pair of pixels are identical, said particular dependent color being a color which is not the average of said first and second independent colors of said pair of pixels; and said control means in response to said graphics data causing the generation of said first independent color, said particular dependent color, and said identical independent color, in that order.

2. The apparatus of claim 1, comprising:

means for modifying said graphics data associated with one of said pair of pixels to be indicative of a different independent color;

said control means being responsive to an operator code included in said graphics data for interpolating between first and second different independent colors to produce an intermediate color which represents the average of said first and second different independent colors;

said control means in response to said graphics data causing the generation of said first independent color, said intermediate color, and said identical independent color.

3. The apparatus of claim 2, wherein:

said means for modifying said graphics data associated with one of said pair of pixels is an adder, and said adder increments the value of said graphics data.

4. The apparatus of claim 2, wherein:

said means for modifying said graphics data associated with one of said pair of pixels is a switch which substitutes new graphics data for said graphics data associated with one of said pair of pixels.

5. Apparatus for generating graphics, comprising:

memory means for storing graphics data words;

control means for reading at least three of said graphics data words from said memory means, each of said digital words comprising N binary bits and relating to a color for a respective pixel;

said control means determining if each of said graphics data words represents an independent color, or an interpolation operator code, said independent color being one of $2^N-1$ independent colors represented by N-bit data words, wherein one of said N-bit data words is said interpolation operator code;

said control means determining if first and second independent colors associated with a pair of pixels represent an identical independent color, and if said graphics data associated with a third pixel is said interpolation operator code;

said control means, in response to said determination, producing a particular dependent color for each case when said first and second independent colors of said pair of pixels are identical, said particular dependent color being a color which is not the average of said first and second independent colors of said pair of pixels;

said control means in response to said graphics data causing the display of said first independent color, said particular dependent color, and said identical independent color, in that order.

6. A method for generating graphics, comprising the steps of:

reading at least three graphics data words from a memory means, each of said graphics data words being associated with a respective pixel;

determining if each of said graphics data words represents an independent color, or an interpolation operator code, said independent color being one of $2^N-1$ independent colors represented by N-bit data words, wherein one of said N-bit data words is said interpolation operator code;

determining if first and second independent colors associated with a pair of pixels represent an identical independent color, and if said graphics data associated with a third pixel is said interpolation operator code;

producing, in response to said determination, a graphics data word representing a particular dependent color for each case when said first and second independent colors of said pair of pixels are identical, said particular dependent color being a color which is not the average of said identical independent colors of said pair of pixels; and displaying, in response to said graphics data, said first independent color, said particular dependent color, and said identical independent color, in that order.

7. The method of claim 6, comprising the steps of:

modifying said graphics data word associated with one of said pair of pixels to be indicative of a different independent color; and interpolating, in response to said interpolation operator code included in said graphics data, between first and second different independent colors to produce an intermediate color which represents the average of said first and second different independent colors; and displaying, in response to said graphics data, said first independent color, said intermediate color, and said identical independent color, in that order.

* * * * *